O. C. WOOLSON.

ROPE DRIVING APPARATUS.

No. 10,407. Reissued Nov. 20, 1883.

Witnesses
Thos. S. Crane
Henry Theurath,

Inventor
Orosco Charles Woolson

UNITED STATES PATENT OFFICE.

OROSCO CHARLES WOOLSON, OF NEWARK, NEW JERSEY.

ROPE-DRIVING APPARATUS.

SPECIFICATION forming part of Reissued Letters Patent No. 10,407, dated November 20, 1883.

Original No. 285,095, dated September 18, 1883. Application for reissue filed October 8, 1883.

285095

*To all whom it may concern:*

Be it known that I, OROSCO CHARLES WOOLSON, a citizen of the United States, residing at the city of Newark, county of Essex, and State of New Jersey, have invented a new and useful Improvement in Rope-Driving Apparatus, of which the following is a specification, reference being had to the drawings thereof, which form part of this specification.

Figure 1:
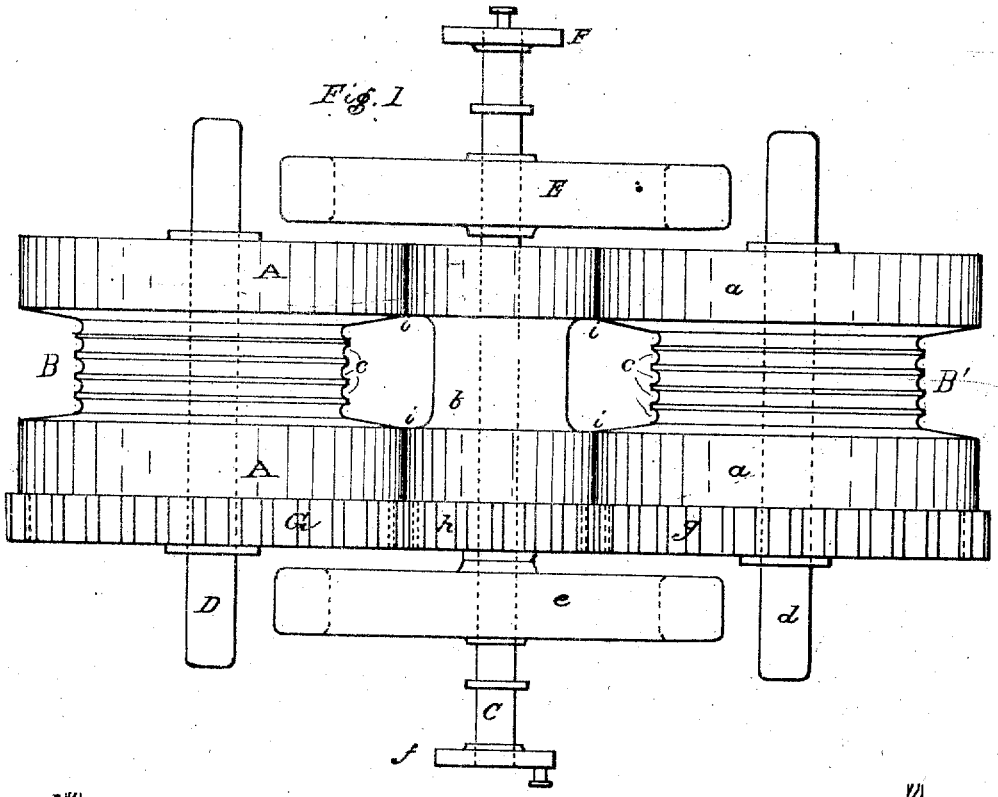
Figure 2:
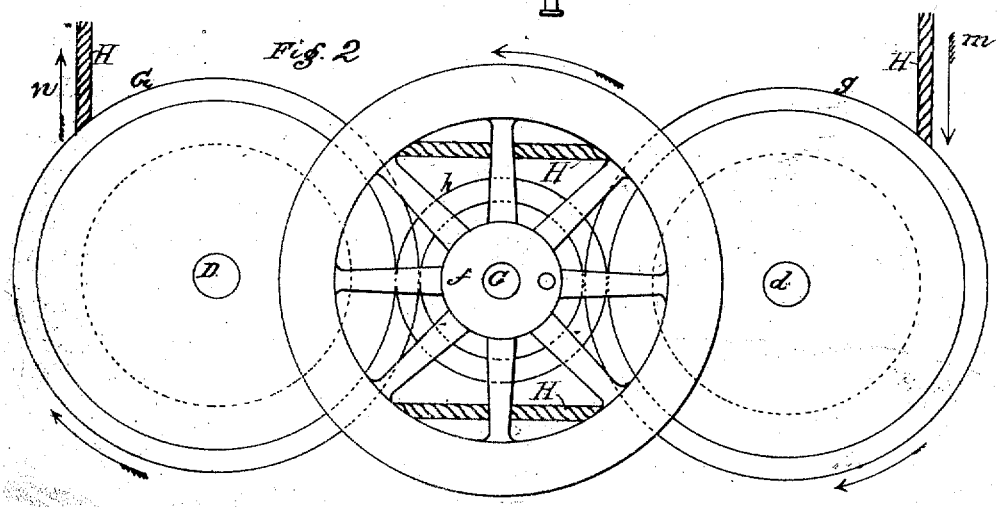

Figure 1 represents a plan of the whole gearing, and Fig. 2 represents a side elevation of the same, no part of the framing being shown in either figure, and the traction-rope being shown only in Fig. 2, where it appears behind the other parts.

The invention relates to that class of mechanism employed to propel a rope-traction; and it consists, primarily, in the combination, with two winding-drums, each provided with friction-faces and having an intermediate anti-friction drum, of toothed gear-wheels applied to impart positive movement to one or both of said drums.

The object of my invention is, first, to prevent the slipping of the friction-faces of the drums, which occurs when the former are used alone as driving agents, and at the same time not to impair the usefulness of the intermediate drum as an anti-friction bearing.

The object of my invention is, second, to obviate the use of auxiliary shafts to sustain the auxiliary driving medium afforded by the toothed gears, and this object I attain by applying the required gears upon the same shafts that carry the rope-drums and friction-surfaces and concentric therewith.

To enable others to understand my invention, I will describe the same in detail, and then point out the difference between my combination and others already known.

B B′ represent the rope-drums, and H the rope, the drums being shown with five annular grooves, *c*, adapted to fit the rope.

A *a* are cylindrical friction-surfaces formed upon the drums, and D *d* are the shafts sustaining the drums, and intended to revolve in suitable bearing-boxes.

C is a motor-shaft, located midway between the drums B B′ and carrying the anti-friction drum *b*, constructed to rotate in contact with the wheels A *a*. This shaft is also shown provided with crank-disks F *f*, to couple to the engine or other motor, and with fly-wheels E *e*, to give steadiness to the motion of the drums. The rope is shown by arrow *m* in Fig. 2 as brought downward to the drum B′ and carried beneath its lower side to the bottom of the other drum, B. It is then commonly wrapped half-way around the drum B, and thence carried back and forth over and under the two drums, encircling only the outer half of each, until the desired grip has been secured, when it is carried off, as at *n*. When the working-tension acts upon the rope it operates powerfully to draw the drums B B′ together, and would create a great friction upon the bearings of the shafts D *d*, except for the presence of the anti-friction drum *b* between the friction-faces A *a*, which drum thus receives a powerful pressure and becomes a convenient agent to transmit the motion of the engine or other motor to the drums B by friction, if desired.

The construction described, and such a use of the anti-friction drum *b*, has been known prior to my invention; but the drum was defective as a driving agent, because its operative friction varied with the tension upon the rope, which in turn was affected by variations in the load applied to it. The friction-faces A *a* and the rope-drums B B′ were therefore liable to slip and move irregularly, even when the motor-shaft C had a uniform motion imparted to it; and my invention consists in supplementing such a construction by applying toothed gears to the same shafts that carry the parts, heretofore driven by friction, to rotate one or both of the rope-drums at a positive rate of speed. Such gears are shown at G *g h*, the two former being applied to the shafts D *d*, carrying the drums B B′, and the latter to the motor-shaft C, to propel the shafts D or *d* positively without chance for slipping. Such gears necessarily become the prime movers, as their teeth are unyielding, and if any discrepancy from errors in construction exists between the relative rotations of the toothed and friction wheels, the latter must accommodate themselves to the former by dragging upon their friction-faces, if secured to their respective shafts, as in former constructions.

It will be observed that the parts of the drums B B′ which bear against the anti-friction drum *b*, as at *i i* in Fig. 1, may be regarded as friction-faces, or subjected to pressure and friction from the tension of the rope, and that the opposed parts of the drums *b* are also friction-faces in the same sense, although the latter is called an "anti-friction" drum in regard to its effect in avoiding friction at the rope-drum shaft D *d*. By leaving the drum *b* loose upon its shaft the tendency to create any drag upon the toothed wheels is entirely obviated, without, however, at all affecting or impairing the usefulness of the intermediate drum as an anti-friction bearing. Such construction also affords the means for renewing the central drum, *b*, when worn, without renewing the larger wheels A *a*, (which do not wear so fast,) as no fixed proportion is required between the diameters of the friction-circles, when the drum *b* is restricted to its proper function of sustaining the inward pressure of the drums B B′ under the tension of the rope. My invention thus affords the means of retaining the central shaft, C, or the motor-shaft, and utilizing the most important function of the anti-friction drum on such shaft, while supplementing and correcting its defects when used as the driving-drum.

I have stated above that the arrangement of an anti-friction drum between two rope-drums was known before my invention, and I am aware that a modification of such construction is shown in United States Patent No. 190,594, May 8, 1877.

I am also aware that a combination of three toothed wheels and two rope-drums is shown (without any friction or anti-friction wheels) in United States Patent No. 59,697, and that other combinations different from mine have been heretofore invented, and I therefore disclaim said patents and any other combination than those set forth herein as new.

It is obvious that the use of a toothed wheel, G *g*, upon either of the rope-drum shafts, in mesh or contact with the toothed wheel *h* upon the motor-shaft, will effectually prevent the slipping or imperfect transmission of the motion, and as that is the object of this invention I do not limit myself to the use of all three wheels, such as are shown in the drawings.

The relative diameters of the drums B or B′ to the wheels A or *a* is immaterial; but I have shown those portions of the rope-drums which contain the grooves *c* of smaller diameter than the friction-faces A *a*, to prevent the deposit of grease and other foreign matter upon the friction-surfaces in contact at *i i* in Fig. 1.

Having thus fully set forth the nature of my invention, I claim the same as follows:

1. The combination, in a rope-driving apparatus, of two rope-drums provided with an intermediate anti-friction drum and toothed gearing arranged and operated to drive one or both of the rope-drums independently of the anti-friction drum, substantially as shown and described.

2. The combination, with the shafts D *d* and the drum B B′, having friction-faces A *a*, arranged and operated as described, and provided with an intermediate motor-shaft, C, carrying an anti-friction drum, *b*, of toothed gear-wheels applied to the motor-shaft, and one or both of the rope-drums, to drive the latter positively, substantially as shown and described.

3. The gear-wheels G and *g* and *h*, in combination with drums B and B′ and *b*, made substantially in the manner herein specified, having friction-faces A *a* formed on a portion of the drums' peripheries, and grooves or other adequate space formed on another portion of the drums' peripheries, substantially as described.

OROSCO C. WOOLSON.

Witnesses:

THOS. S. CRANE.

H. THEBERATH.